United States Patent [19]

Wentworth

[11] 4,333,218
[45] Jun. 8, 1982

[54] METHOD OF REPAIRING A BOX BEAM

[76] Inventor: Alan W. Wentworth, 41 Mayfair Rd., Warwick, R.I. 02888

[21] Appl. No.: 154,811

[22] Filed: May 30, 1980

[51] Int. Cl.³ .................. B22D 19/10; B23K 31/00
[52] U.S. Cl. .................. 29/402.16; 52/514; 52/731; 52/728; 29/155 R; 29/155 C; 228/119; 403/311; 403/11; 403/271; 285/286; 219/106; 219/107; 219/59.1; 138/99
[58] Field of Search .......... 29/402.16, 402.01, 402.02, 29/402.09, 402.11, 402.12, 402.13, 402.14, 402.15, 402.17, 155 R, 155 C, 402.08, 402.18, 157.3 R, 157.3 A, 157.3 B, 157.3 C, 157.3 V, 157.3 D, 157.4, 463, 527.2; 138/98, 97, 99; 113/118 R, 118 A, 118 B, 118 C, 118 D, 1 C, 116 C, 116 W, 1 M; 72/369, 453.15, 367; 219/104, 106, 107, 59.1; 52/170, 514, 740, 733, 728, 735, 726, 731; 285/286; 403/23, 271, 272, 11, 12, 310, 311; 228/119, 183, 184

[56] References Cited

U.S. PATENT DOCUMENTS

| | | | |
|---|---|---|---|
| 216,865 | 6/1879 | Kinsey et al. | 52/731 |
| 260,343 | 6/1882 | Yakel et al. | 29/463 X |
| 732,400 | 6/1903 | Dresser et al. | 138/99 |
| 1,263,739 | 4/1918 | Brown | 228/119 |
| 1,638,892 | 8/1927 | Stresau | 113/116 W |
| 1,700,319 | 1/1929 | Kjekstad | 113/116 UX |
| 1,721,695 | 7/1929 | Hufferd et al. | 29/463 X |
| 1,770,932 | 7/1930 | Leake | 228/119 |
| 1,888,166 | 11/1932 | Geipel | 29/463 |
| 2,031,863 | 2/1936 | Snell | 29/463 |
| 2,993,270 | 7/1961 | Broman | 29/463 |
| 3,054,176 | 9/1962 | Beneke | 29/463 X |
| 3,267,627 | 8/1966 | Hammitt | 52/276 |
| 3,754,318 | 8/1973 | Trost | 29/527.2 |
| 3,962,767 | 6/1976 | Byerley et al. | 138/98 |
| 4,153,067 | 5/1979 | Ray | 138/97 |

FOREIGN PATENT DOCUMENTS

| | | | |
|---|---|---|---|
| 80272 | 5/1952 | Norway | 403/211 |
| 397204 | 8/1933 | United Kingdom | 52/726 |

Primary Examiner—Francis S. Husar
Assistant Examiner—V. K. Rising
Attorney, Agent, or Firm—Barlow & Barlow

[57] ABSTRACT

A method of repairing a box beam is disclosed in which a cracked or broken portion of a box beam may be repaired and the strength returned to normal by forming a pair of plates that fit snugly about at least one half of the box beam, the plates being welded to the box beam and to each other, each edge of the plates being either welded to its juxtaposed plate or to the box beam to provide full strength to the structure.

5 Claims, 6 Drawing Figures

METHOD OF REPAIRING A BOX BEAM

BACKGROUND OF THE INVENTION

Particularly in the automotive field there is utilized box beam structures and more particularly box beam structures are found in certain automotive front suspension structures. Being exposed to all forms of corrosion, road salt and the like, box beams used in automobiles, can readily develop rusted sections which weaken and eventually crack. In the past it has been necessary to replace the entire beam, which quite often, as for example in the Volkswagen Beetle type automobile, has required the purchase of an entire front axle assembly, which is a costly item. Therefore, the main object of the instant invention to provide a convenient method of repair of the box beam structure while it is in place on the vehicle and more broadly to provide box beam repairs in general.

SUMMARY OF THE INVENTION

The invention relates to a method of repairing a box beam, which box beam is defined as having at least front, back and side walls, the side wall possibly including a flanged member piece. It encompasses the concept of first cleaning the existing box beam free of all dirt and grease accomplished by suitable degreasing compounds and wire brushing and the like. A pair of plates are then suitably formed to snugly fit about at least one-half of the box beam, the plates being formed as for example as a U-shaped section with or without outwardly extending flanges therefrom. The plates as suitably formed are then clamped in position on the front and back walls of the box beam, and all of the edges of the plates, including the edges that are exposed at the side walls and the top edges are welded together or to the box beam as is appropriate in the structure. In some cases, it is advantageous to provide outwardly extending flanges, which flanges can be welded together directly so that the plates will form an integral structure in and of themselves of their own new steel, and then in turn the upper edges are welded to the box beam to provide the integral repair to the beam. After the repair has been completed the surface can again be cleaned and suitably painted with primer paint and a tar-based undercoat to fully protect the repaired area from further intrusion of corrosive elements.

DESCRIPTION OF THE PREFERRED EMBODIMENT

Figure 1:
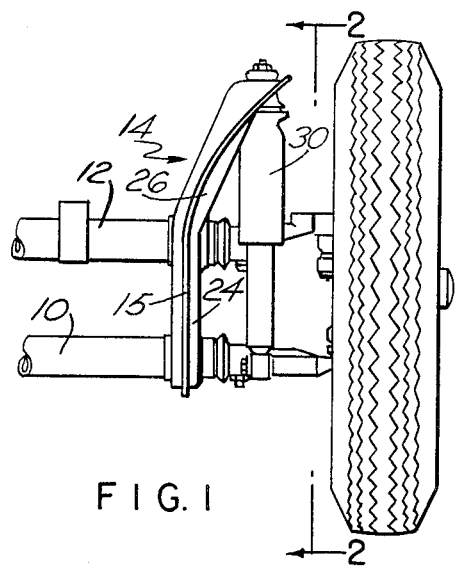
FIG. 1 is a front elevational view showing a box beam construction in the context of a front axle for an automotive vehicle.
Figure 2:
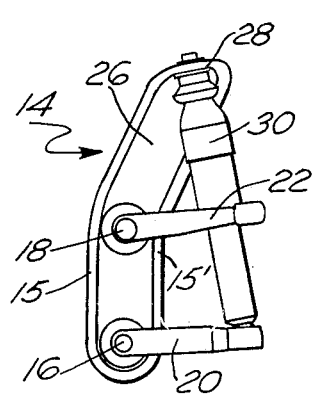
FIG. 2 is a sectional view taken on lines 2—2 of FIG. 1.

Referring to FIG. 1, a portion of the front axle beam in an automotive vehicle is shown, which comprises a first tubular member 10 that encloses a torsion bar and a second tubular member 12 in which is also received the second torsion bar, these two members being connected together at either end by a box beam structure generally designated 14, only one such structure being shown. The box beam structure has apertures with suitable bearings through which the torsion bar 16 (See FIG. 2) extends and through which the torsion bar 18 extends, each of these bars being respectively connected to torsion arms 20 and 22. The box beam is defined by a lower portion 24 which extends between the portions 10 and 12 and continues upwardly with a portion 26 that has an aperture therein as at 28 into which the upper end of a shock absorber 30 is received.

Figure 4:
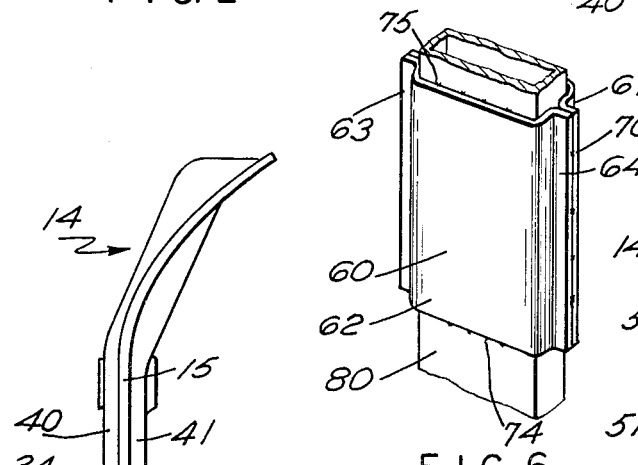
FIG. 4 is an elevational view of the box beam showing failures therein.

In structures of this nature and as a result of considerable stress as well as the effects of road salt, water and other elements, the box beam at the section 24 will develop cracks and other fatigue points as seen by the cracks shown at 34 in FIG. 4. It is to be appreciated that this considerably weakens the entire structure and support for the front end of the automotive vehicle, and under normal circumstances as the box beam and the tubular portions 10 and 12 are integral formed-up units, it may become necessary to replace the entire unit in order to make the automotive vehicle safe to drive.

Figure 3:
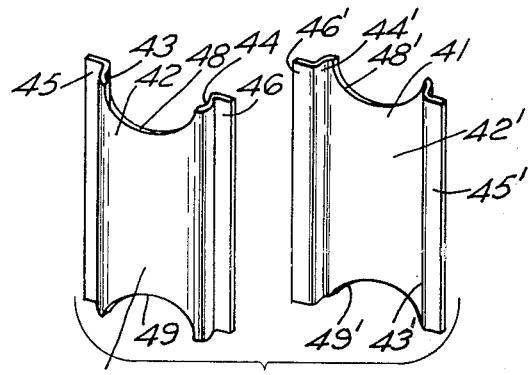
FIG. 3 is a detached perspective view of the repair plate.
Figure 5:
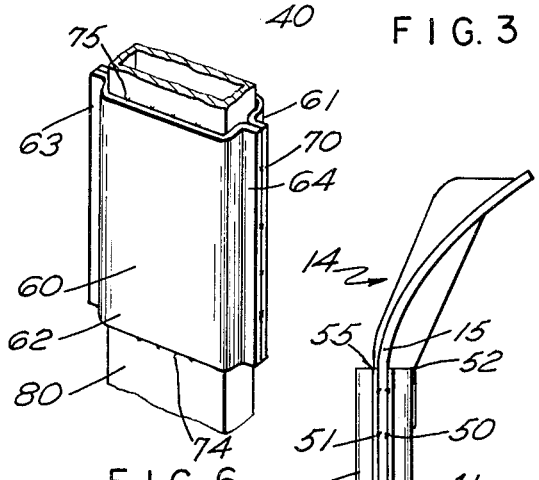
FIG. 5 is a view of the box beam completely repaired.

In order to obviate a complete replacement there is formed from sheet material a pair of plates, designated 40 and 41, (see FIG. 3) which are identical plates and which as shown have in effect a face 42, 42' with an inturned edge such as 43, 44, 43', 44', and then outwardly turned lips 45, 45', 46, 46'. These plates 40, 41 are placed on either side of the box beam as seen in FIG. 5. The cut-outs as at 48 and 49 for example being adapted in this particular instance to fit about the bosses that are formed by the cylindrical members 10 and 11 passing through the box beam. In some instances the area about the cut-outs may be further formed to provide a proper fit, as for example, by flaring from the planar extent of face. It will of course be apparent that before the plates are positioned on the box beam and assuming that the box beam is rusted and has a coating of grease and other materials thereon it is first necessary to clean the box beam by the use of suitable degreasing compounds and then as necessary clean out any additional rust that may be present. At this point, if desired, the box beam may be painted in the central portion thereof leaving the ends where the upper and lower edges of the plates 40 and 41 will contact absolutely clean. The plates are then clamped in position and welding material is used to make joints as seen at 50, 51, 52, 53, 54, and 55 so that all of the edges of the plates 40 and 41 have been welded together and to the box beam structure. After the welding has been completed the repair may now be suitably painted with primer paint and then with undercoating material such as a tar-based compound or the like. The box beam has now been returned to its original strength and situation.

Figure 6:
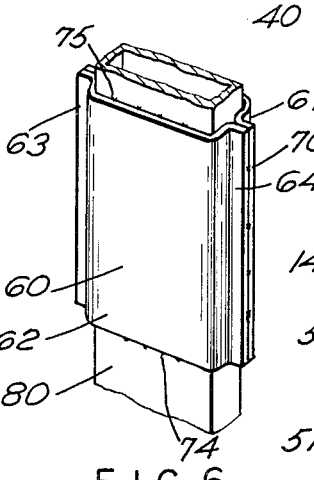
FIG. 6 is a perspective view showing the utilization of the repair device on any box beam structure.

It will be noted in the particular illustration made herein that the box beam to which reference has been had includes a particular structure with a web such as 15, 15' which web has been utilized merely for convenience in structural assembly, and to this end the plates that are utilized for repair purposes have been provided with mating outwardly turned flanges 45, 46. It will be apparent, however, that the method of repair will apply to any box beam and with reference to FIG. 6 a typical rectangular box beam 60 has been illustrated with repair plates 60 and 61 which have been formed with face portions such as 62 and downwardly turned side edges such as 63, 64. This type of structure can indeed be utilized for any type of box beam repair, and in the illustration of FIG. 6 the repair plate 40a is welded as at 74, 75 and the edges as at 70 are also welded to the box beam and also to a mating repair plate such as a repair plate 61 which would be identical to the illustrated plate 60 and utilized in precisely the same fashion as that described in connection with repair plates 40 and 41.

Thus it will be seen from the foregoing that there has been disclosed a new type of box beam repair that will have the original strength of the box beam as originally constructed provided the plates 40 and 41 are made of a gauge which is commensurate with the gauge of the metal used in the original box beam. This results in a structure which will not readily crack or break because of the stresses that are placed thereon, the entire stress being taken up by the new plates and not by the original section of the box beam. By utilizing the method of the instant invention it has been possible to repair broken front ends of vehicles at a fraction of the cost of normally repairing by purchasing and installing an entirely new axle assembly. In many instances the repaired front axle assembly, in particular the repaired box beam, is better than a new one in that a new one quite often has internal stresses in the metal which are not known or realized and under the strains in a front axle assembly are liable to crack and break as did the original front axle assembly which initiated the repair.

I claim:

1. The method of repairing a weakened rigid box beam of external angular cross section having a front, back and side walls, comprising the steps of forming a plate to snugly externally fit said front wall and a portion of each adjoining side wall of said beam, forming a second plate to externally snugly fit said back wall and a portion of each adjacent side wall, said front and back side wall edge portions respectively in close adjacency, clamping both plates in position and welding all edges of said plates to each other and to the box beam to secure said plates together in position embracing and strengthening said box beam.

2. The method of claim 1, including the step of forming said plates with outwardly turned flanges.

3. The method of claim 2 characterized in that the outwardly turned flanges are welded to each other to form a complete enclosure about said beam.

4. The method of claim 1, wherein the beam has protrusions, including the step of further forming the plates to fit around all protrusions in said box beam, the walls tightly abutting the box beam.

5. The method of claim 1, wherein the box beam has members passing through it blocking access through it.

* * * * *